(12) United States Patent
Van Kuijk et al.

(10) Patent No.: US 11,965,542 B2
(45) Date of Patent: Apr. 23, 2024

(54) SYSTEM FOR POSITIONING A VIEWING SCREEN

(71) Applicant: Vogel's IP B.V., Eindhoven (NL)

(72) Inventors: Ewald Van Kuijk, Eindhoven (NL); Alwin Einar Van Der Wolf, Eindhoven (NL)

(73) Assignee: VOGEL'S IP B.V., Eindhoven (NL)

(*) Notice: Subject to any disclaimer, the term of this patent is extended or adjusted under 35 U.S.C. 154(b) by 100 days.

(21) Appl. No.: 17/857,813

(22) Filed: Jul. 5, 2022

(65) Prior Publication Data
US 2023/0047853 A1 Feb. 16, 2023

(30) Foreign Application Priority Data
Jul. 6, 2021 (NL) .................................... 2028635

(51) Int. Cl.
*F16B 7/04* (2006.01)
*F16M 11/04* (2006.01)
*F16M 13/02* (2006.01)

(52) U.S. Cl.
CPC ......... *F16B 7/0493* (2013.01); *F16M 11/041* (2013.01); *F16M 13/02* (2013.01); *F16M 2200/02* (2013.01)

(58) Field of Classification Search
CPC .. F16M 11/041; F16M 2200/02; F16M 13/02; F16B 7/0493
See application file for complete search history.

(56) References Cited

U.S. PATENT DOCUMENTS

| | | | | |
|---|---|---|---|---|
| 7,334,766 B2* | 2/2008 | Ligertwood | ........... | F16M 11/22 248/299.1 |
| 7,441,739 B2* | 10/2008 | Huang | ................... | F16M 13/02 248/917 |
| 7,878,473 B1* | 2/2011 | Oh | ....................... | F16M 11/046 248/490 |
| 8,235,341 B2* | 8/2012 | Taylor | .................... | F16M 13/02 248/274.1 |
| 8,262,044 B2* | 9/2012 | Luijben | .................. | F16M 11/10 248/920 |
| 8,333,355 B2* | 12/2012 | Stifal | ................. | F16M 11/2092 248/920 |
| 8,690,111 B2* | 4/2014 | Huang | ................... | F16M 11/10 248/371 |

(Continued)

FOREIGN PATENT DOCUMENTS
EP 1112894 A2 7/2001

*Primary Examiner* — Eret C McNichols
(74) *Attorney, Agent, or Firm* — Procopio, Cory, Hargreaves & Savitch LLP

(57) ABSTRACT

The invention provides a system for positioning a viewing screen. The system comprises a base body and at least one screen body. The screen body comprises a suspension hook and, on the one hand, is configured to be rigidly connected, at least in one position of the screen body, to the base body and, on the other hand, is configured to fasten a viewing screen thereto. The system further comprises a securing body for releasably securing the rigid connection between the base body and the screen body. The base body comprises a suspension edge. The suspension hook and the suspension edge are configured to suspend the screen body from the suspension edge of the base body via the suspension hook.

17 Claims, 4 Drawing Sheets

(56) References Cited

U.S. PATENT DOCUMENTS

| | | | | |
|---|---|---|---|---|
| 9,339,113 B1* | 5/2016 | Cheng | ............... | F16M 13/022 |
| 9,897,250 B1* | 2/2018 | Sivertsen | ............... | F16M 13/02 |
| 10,064,489 B2* | 9/2018 | Sculler | ............... | F16M 13/02 |
| 11,112,058 B2* | 9/2021 | Floe | ............... | F16M 11/045 |
| 11,473,722 B2* | 10/2022 | Amidei | ............... | F16M 11/10 |
| 2001/0012359 A1 | 8/2001 | Gester et al. | | |
| 2005/0167549 A1* | 8/2005 | Ligertwood | ............... | F16M 13/02 |
| | | | | 248/122.1 |
| 2009/0052128 A1* | 2/2009 | Yeh | ............... | F16M 11/041 |
| | | | | 361/679.27 |
| 2010/0187385 A1 | 7/2010 | Luijben et al. | | |
| 2011/0198461 A1* | 8/2011 | Truckor | ............... | F16M 11/30 |
| | | | | 248/205.1 |

* cited by examiner

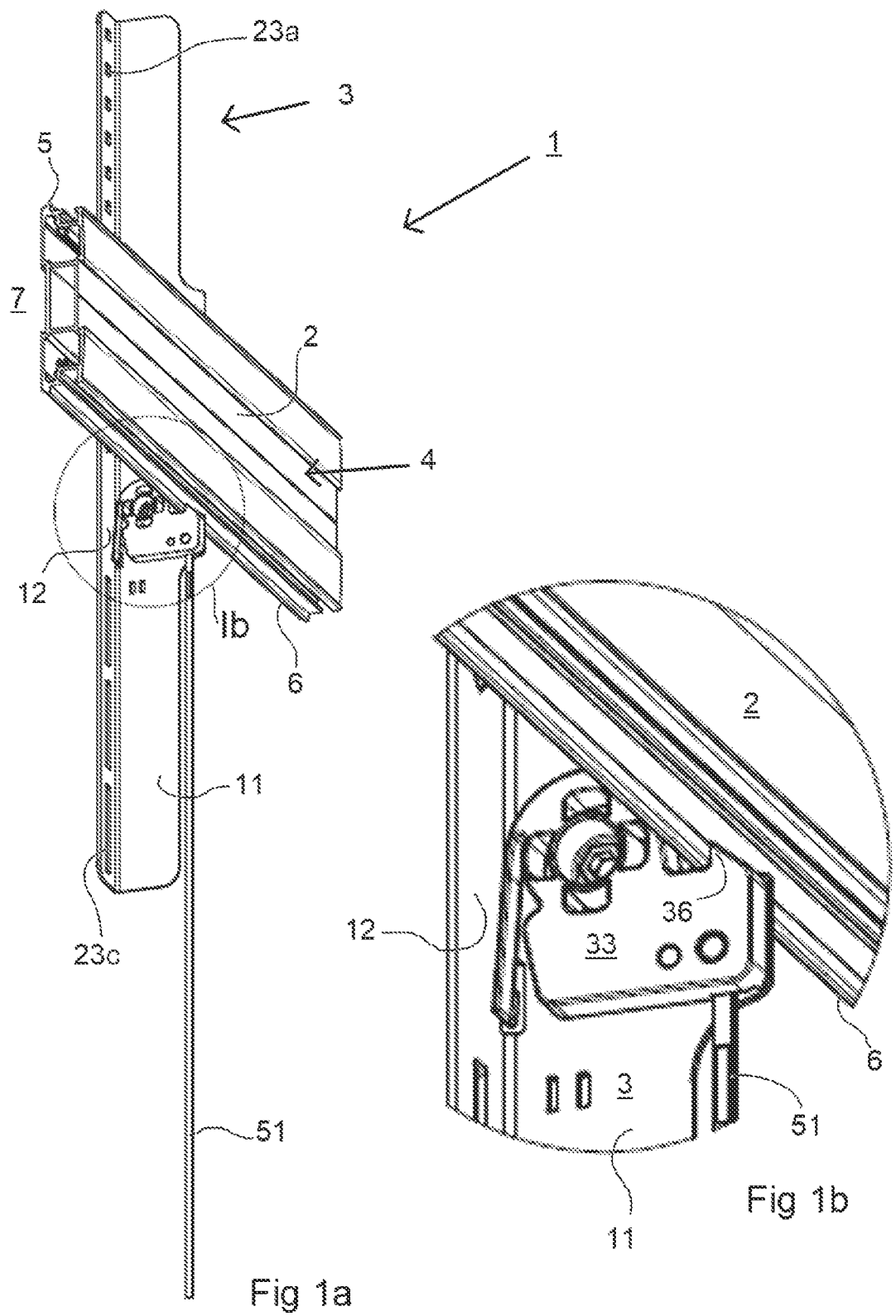

SYSTEM FOR POSITIONING A VIEWING SCREEN

BACKGROUND

Cross Reference to Related Applications

The present application is based on and claims priority from Dutch Patent Application No. 2028635, filed on 6 Jul. 2021, the entire content of which is incorporated herein by reference for all purposes.

SUMMARY

The present invention relates to a system for positioning a viewing screen. With such systems, it is known to use a screen body and a base body. The screen body is then, on the one hand, configured to fasten a viewing screen thereto, for example due to the fact that fastening holes in accordance with the VESA system are provided therein. On the other hand, the screen body is configured such that it is or at least will be connected to a base body. This connection may be semi-permanent in the sense that it is in principle not intended to be detached, except occasionally for example in case of a move. The connection between the screen body and the base body may also be of the hingeable type, for example in order to be able to direct a screen towards a viewer.

The invention aims to provide a system which can have a constructionally simple configuration and, in association therewith, can be assembled in a relatively simple manner without impairing the functionality of the system or even with an improvement of this functionality. To this end, the invention provides a system according to claim 1. The invention is in this case based on the understanding that a rectilinear sliding displacement of a securing body between a securing position and a free position, such as is known, for example, from US 2010/0187385 A1, entails an inherent risk of a certain degree of tilting, as a result of which measures have to be taken in order to prevent undesired tilting. By using a securing body whose displacement between the securing position and the free position is a pivoting displacement instead of one sliding along a rectilinear path, the need for such measures disappears and the system can have a constructionally simple configuration. This also entails the advantage that, in principle, simple assembly must be possible. The viewing screen can be fastened to the system in a very reliable manner because the base body comprises a suspension edge and the screen body comprises a suspension hook in order to suspend the screen body from the suspension edge of the base body via the suspension hook.

The advantages regarding constructional simplicity and relatively simple assembly may in particular be relevant if the screen body comprises a first recess and the securing body has a protruding part which is inserted in the recess, wherein at least one part of the periphery of the protruding part of the securing body has a circular profile and adjoins at least one part of the periphery of the first recess in a guiding manner for guiding cooperation between the periphery of the protruding part and the recess during pivoting of the securing body between the securing position and the free position. Said guiding adjoining arrangement makes the pivoting connection between the securing body and the screen body possible in a constructionally simple manner. In this case, at least one part of the periphery of the recess is preferably also circular, in which case the axes of the respective (partial) circle shapes of the securing body and the screen body coincide.

In a further embodiment, the first recess has at least one outwardly directed recess part and the protruding part of the securing body comprises, on the periphery thereof, at least one outwardly directed retaining part, which at least one retaining part is configured to, during assembly of the securing body on the screen body, be inserted from a first side through the at least one recess part and to subsequently be rotated about the pivot axis such that the retaining part comes to lie against a second side of the screen body that is situated opposite to the first side. After the at least one retaining part has been inserted through the at least one recess part as mentioned, the securing body and therefore the at least one recess part can be rotated about the pivot axis, as a result of which the at least one retaining part comes to lie in the region of the circular part of the periphery of the recess, thus allowing the at least one retaining part to retain the securing body with respect to the screen body, at least in a direction parallel to the pivot axis. Advantageously, the first recess has more than one, for example three or four, recess parts which are preferably situated at an equal angular distance from each other. Further preferably, the number of recess parts corresponds to the number of retaining parts.

The constructional simplicity and the simplicity of the assembly process may be further improved if the spring member comprises at least one resilient lip, and in particular if the at least one resilient lip forms part of the securing body, preferably an integral part thereof.

A further simplification of the assembly process may be achieved if the screen body comprises a second recess and the spring member has a fixing part which is inserted in the second recess in order to fix the spring member with respect to the screen body at the location of the fixing part.

In particular if the spring body comprises at least one resilient lip, in one embodiment, during pivoting of the securing body from the securing position to the free position, the spring body bears against a stop surface of the screen body or at least of a part rigidly connected thereto and the spring body compresses. Thus, the desired operation of the spring body is achieved in a simple manner.

In order to facilitate the removal of the viewing screen when using the system, it may be advantageous if the system has a blocking device for blocking the securing body in the free position thereof. It is thus possible for the securing body to first be pivoted from the securing position to the free position and then be held in this free position by means of the blocking device. It is subsequently possible for the viewing screen, together with the screen body, to be removed from the base part, which is necessary, for example, for the purpose of maintenance on the viewing screen or a move. The aforementioned operations can thus be carried out by the same person.

In this case, the ease of use may be further increased if the blocking device is configured to automatically start working due to the pivoting of the securing body from the securing position to the free position.

A constructionally simple embodiment of the blocking device may be achieved if the blocking device comprises a first blocking hook edge which pivots together with the securing body, and also a second blocking hook edge which forms part of the screen body or forms part at least of a part rigidly connected thereto, which first blocking hook edge and second blocking hook edge engage with each other under the influence of the resilient action of the spring member with blocking action of the blocking means.

In an alternative embodiment, the system has a slowing device for resisting the action of the spring body during pivoting of the securing body from the free position to the securing position. This has the consequence that the securing body will pivot back from the free position to the securing position more slowly than would be the case if the system were to not be provided with a slowing device. Use can be made of this slowing action since this may afford a user sufficient opportunity to remove the viewing screen, together with the screen body, from the base part, after the user has ensured that the securing body has pivoted from the securing position to the free position. The further advantage that a slowing device has with respect to the use of a blocking device is that if the securing body were to unintentionally pivot from the securing position to the free position, the securing body will not unintentionally assume this free position for an indefinite period of time, whereby the viewing screen would unintentionally not be secured to the securing body. This is because the slowing device will only slow the return of the securing body from the free position to the securing position, but not block it.

A constructionally simple embodiment of the slowing device may be achieved if the slowing device comprises a transmission having two transmission members which, during at least a part of the pivoting of the securing body from the free position to the securing position, preferably during only one part of the pivoting of the securing body from the free position to the securing position, which part preferably comprises the free position, are configured to slow down the speed with which the securing body pivots from the free position to the securing position under the influence of the spring body. It is for example possible for the two transmission members to respectively be a curved rack, the axis of which coincides with the pivot axis, and a pinion which engages with, or at least can engage with, the rack. In this case, the pinion may be configured in such a way that, during pivoting of the securing body from the securing position to the free position and during engagement of the two transmission members, said pinion exerts no, or at least a negligible amount of, braking force on the pivoting of the securing body from the securing position to the free position. However, when the securing body is pivoting back from the free position to the securing position, the pinion may then be configured in such a way that the pinion exerts a noticeable braking force on the last-mentioned pivoting of the securing body. Such pinions are known per se and are marketed, for example, by the Italian manufacturer Fastpoint as rotary dampers.

In order to keep the production costs low, it may be preferable for the securing body to be a plastics product produced by means of injection moulding.

A simple way of bringing about pivoting of the securing body from the securing position to the free position may be achieved if the securing body comprises an elongate pull element for causing the securing body to pivot about the pivot axis from the securing position to the free position counter to the action of the spring member by pulling on the pull element in the length direction thereof.

BRIEF DESCRIPTION OF DRAWINGS

The invention will be explained further by means of a number of possible embodiments of a system according to the invention with reference to the following figures:

FIG. 1a shows an isometric view of a part of the system according to a first embodiment;

FIG. 1b shows detail Ib in FIG. 1a;

Figure 2A:
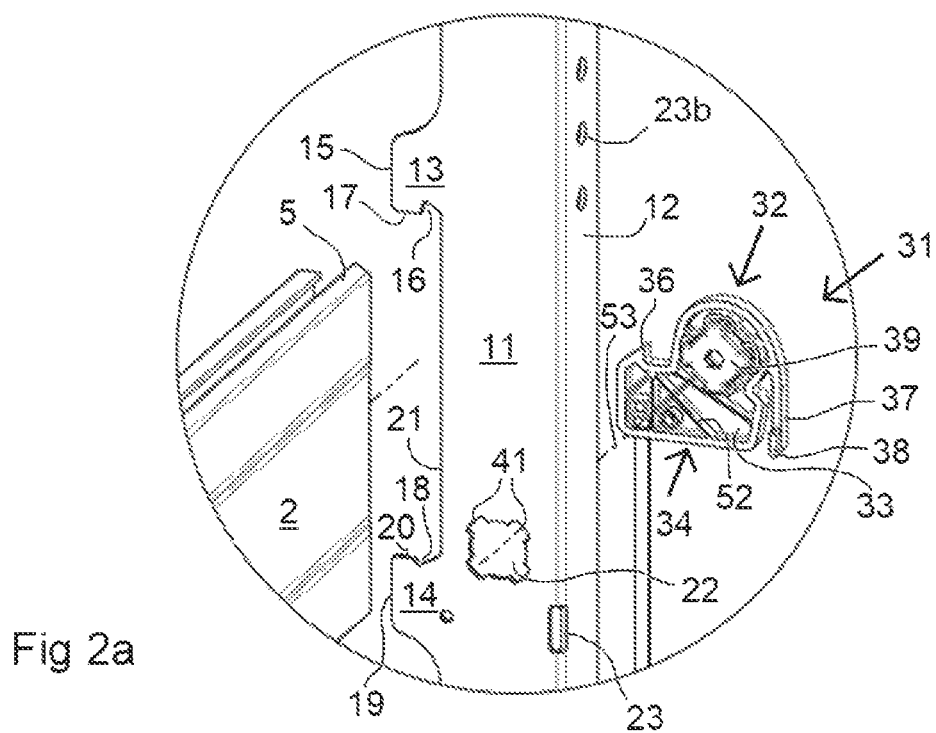
FIGS. 2a to 2c show isometric views of three consecutive phases during assembly of the system according to the first embodiment.
Figure 2B:
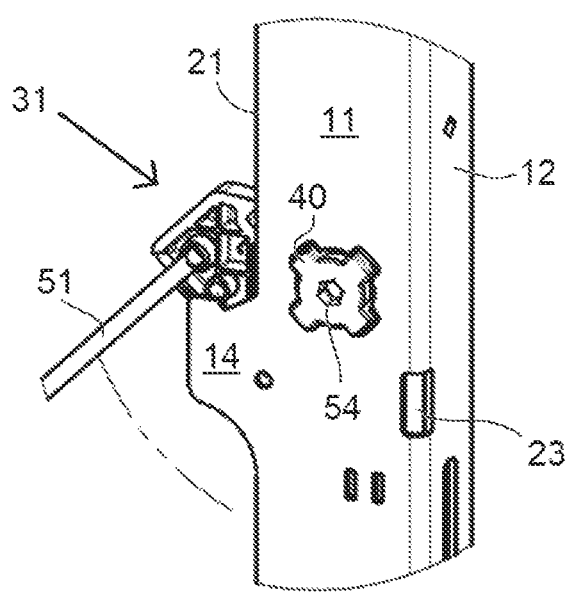
Figure 2C:
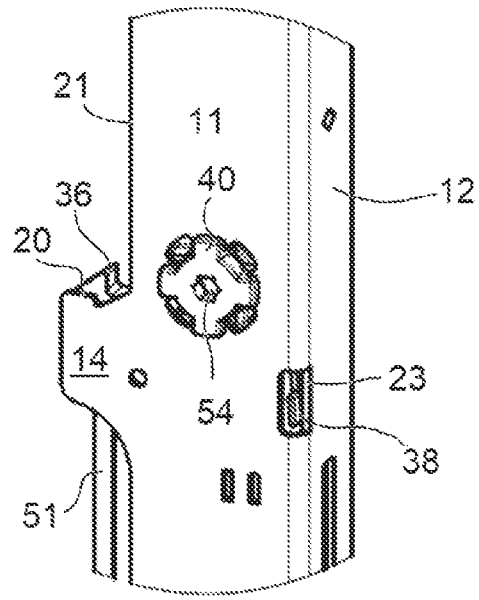

Where relative terms such as front side, rear side, bottom side and top side have been used or will be used in the description above and below, these terms have to be interpreted from the perspective of a viewer facing a viewing screen which is fastened to the system in question.

DETAILED DESCRIPTION

FIGS. 1a to 3c relate to a system 1 according to a first embodiment. The system comprises a base body 2 and two screen bodies 3.

The base body 2 is an extruded aluminium profile, only a part of the length of which is illustrated in FIG. 1a. When using the system 1, base body 2 extends in a horizontal direction and is fastened, for example by way of the rear side 4 thereof, to a wall (not shown in any more detail), for example by means of screws which extend through holes in the base body 2 into plugs which are fitted in the relevant wall. As an alternative, it is for example possible for the base body to be fastened to a construction which is specifically provided therefor and which is placed, for example, on a movable carriage. The base body 2 is provided with a horizontal suspension edge 5 on the top side and with a horizontal first hook edge 6 on the bottom side. The suspension edge 5 and the hook edge 6 are located on the front side 7 of the system 1, which is logically situated opposite to the rear side 4. Such a base body 2 is already known per se.

The system 1 further comprises two screen bodies 3, only one of which is illustrated in FIG. 1a. The two screen bodies 3 are configured in a mirror-symmetrical manner with respect to a vertical plane which extends, during use of system 1, perpendicularly with respect to the base body 2. As an alternative, the screen bodies 3 could also be configured identically to one another. Each screen body 3 is a perpendicularly bent steel plate having a first strip-shaped screen body part 11 and a second strip-shaped screen body part 12, which strip-shaped screen body parts 11, 12 adjoin one another at the perpendicular bend. Two protruding parts 13, 14 which are, at least in the used form, directed towards the rear are provided on the free longitudinal side of the first screen body part 11. The upper protruding part 13 forms a suspension hook having a hook-shaped recess 16. Hook-shaped recess 16 is situated at a distance from the front vertical edge 15 of the protruding part 13 and the form thereof fits with that of the suspension edge 5 of the base body 2. The protruding part 13 also has a horizontal edge 17 which connects the vertical front edge 15 and the hook-shaped recess 16 to one another.

The lower protruding part 14 comprises recess 18, vertical front edge 19 and horizontal edge 20 which connects recess 18 and the vertical front edge 19 to one another.

Between the recesses 16 and 18, the first screen body part 11 comprises a bearing edge 21. As seen in the horizontal direction, the front edges 15 and 19 lie at an equal distance from bearing edge 21 and are thus situated in line with one another. Horizontal edge 17 of protruding part 13 is slightly longer than horizontal edge 20 of protruding part 14 and, logically, hook-shaped recess 18 of the lower protruding part 14 is thus slightly wider than hook-shaped recess 16 of the upper protruding part 13. Furthermore, the vertical distance between the deepest (thus actually highest) point of hook-shaped recess 16 and the horizontal edge 17 is approximately two times as great as the vertical distance between the deepest (thus actually lowest) point of hook-shaped recess 18 and the horizontal edge 20. Provided in the screen body part 11, approximately at the height of the horizontal edge 20, is a recess 22, the form and functionality of which will be explained in more detail.

In the second screen body part 12, various round or slot-shaped recesses 23a, 23b and 23c are provided, collectively denoted by reference numeral 23. These recesses 23 may serve as fastening holes in order to fasten a viewing screen to the front side of the screen body part 12 in a clamping manner by means of bolts which extend from the rear side through such holes 23. In this case, the bolts engage with internal screw threads which are provided on the rear side of the viewing screen in accordance with the VESA system.

Provided below recess 22 and still within the height of the protruding part 14 of the screen body part 11, at the perpendicular bend where the screen body parts 11 and 12 adjoin one another in a perpendicular manner, is a recess 23, the functionality of which will be explained in more detail.

System 1 further comprises a securing body 31 for each of the screen bodies 3. Each securing body 31 is a single-piece plastics component which is produced by means of injection moulding. The securing body 31 comprises a main part 32 having an at least substantially closed longitudinal side 33 and an open longitudinal side 34 situated opposite the latter. Between the longitudinal sides 33 and 34, securing body 31 comprises, inter alia, stiffening ribs 35 which are visible in FIG. 2a owing to the open nature of longitudinal side 34.

On the front side, the main part 32 comprises a second hook edge 36 which is directed upwards and is configured to cooperate with the first hook edge 6 of the base body 2 as will be explained in more detail below. On the rear side, the securing body 31 comprises a resilient lip 37 which is provided, at the lower end thereof and on the side of longitudinal side 34, with ridge 38, which ridge 38 extends on the outer side of the longitudinal side 34.

Securing body 31 further comprises a cylindrical fastening part 39 on the open longitudinal side 34. Fastening part 39 is provided with a hexagonal recess 54, the centre of which coincides with axis 53. The fastening part 39 is provided, at the free end thereof, with four protruding teeth 40 which are provided at an equal angular distance from each other. Those sides of teeth 40 which are directed towards longitudinal side 34 of main part 32 are located at a distance from this longitudinal side 34, which distance is selected to be slightly greater, for example 0.5 mm greater, than the thickness of the first screen body part 11.

Recess 22 is at least substantially circular, the diameter of this circle shape being selected to be slightly greater, for example 0.2 mm greater, than the diameter of the cylinder shape of the fastening part 39. Recess 22 also has, on the periphery thereof, four protruding parts 41 whose form and dimensions are matched to those of the teeth 40 and in such a way that teeth 40 pass precisely through the protruding parts 41 provided that they are aligned therewith.

Securing body 31 and the associated screen body 3 can be assembled in a simple manner. To this end, the axis 53 of the cylinder shape of securing body 31 is aligned with the centre of recess 22, as illustrated in FIG. 2a, and the securing body 31 is rotated through 45 degrees about said axis such that the teeth 40 come to lie directly opposite the recesses 41. The fastening part 39 is subsequently inserted in recess 22 (FIG. 2b), the teeth 40 being displaced through the protruding parts 41 and coming to lie on the outer side of the first screen body part 11. The securing body 31 is then rotated back through 45 degrees. As a result, ridge 38 will be click-fitted in recess 23 owing to the resilient action of lip 37. In the assembled state, the upper point of the second hook edge 36 is situated above the horizontal edge 20 belonging to protruding part 14 of the first screen body part 11, as is in particular visible in FIG. 2c.

The system 1 is also provided with a pull cord 51 for each securing body 31, said pull cord engaging with the securing body 31 directly below the second hook edge 36 of the associated securing body 31, for example by means of a click-fit connection (not shown in any more detail).

Figure 3A:
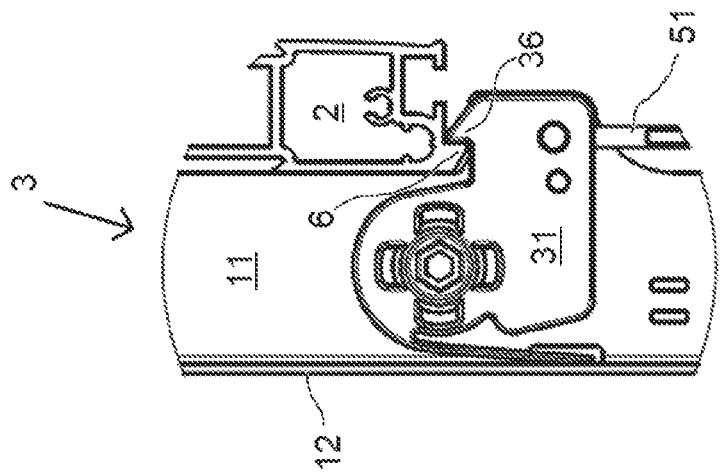
FIGS. 3a to 3c show a perpendicular horizontal view of three consecutive phases during assembly of the system according to the first embodiment.

A more detailed description of how the system 1 functions will be given below. The starting situation is the one in which two screen bodies 3 are fastened parallel to one another to the rear side of a viewing screen to be suspended. The viewing screen is subsequently suspended from the suspension edge 5 via the hook-shaped recesses 16 of the respective screen bodies 3, the viewing screen, and thus the screen bodies 3, still being inclined slightly with respect to a vertical plane, as illustrated in FIG. 3a. The viewing screen is subsequently pivoted from this slightly inclined orientation around suspension edge 5 to a vertical orientation, as a result of which the bearing edge 21 comes to bear against the rear side of base body 2. In this case, the distance between the upper point of recess 16 and the horizontal edge 20 is such that hook edge 6 of the base body 2 and the horizontal edge 20 still remain just free from each other, as is clearly visible in FIG. 3b. The oblique flanks of first hook edge 6 and second hook edge 36 slide along each other, as a result of which the securing body 31 pivots, clockwise in FIG. 3a, about axis 52 counter to the action of the resilient lip 37 which strikes against the inner side of the second screen body part 12. As soon as the outer points of the first hook edge 6 and the second hook edge 36 have passed each other completely, the securing body 31 will pivot back under the influence of the resilient action of lip 37, after which the second hook edge 36 engages with the first hook edge 6 in a secure manner. In case securing body 31 were to unexpectedly not be secure, recess 18 in the lower protruding part 14 of the first screen body part 11 prevents the first hook edge 6 from engaging in this recess 18 if the viewing screen is lifted slightly or is pushed upwards, as a result of which undesired tilting of the viewing screen about the suspension edge 5 is prevented.

Figure 3B:
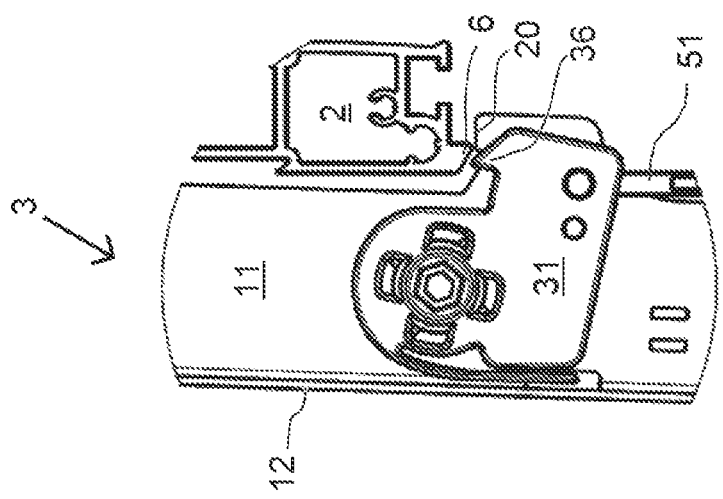
Figure 3C:
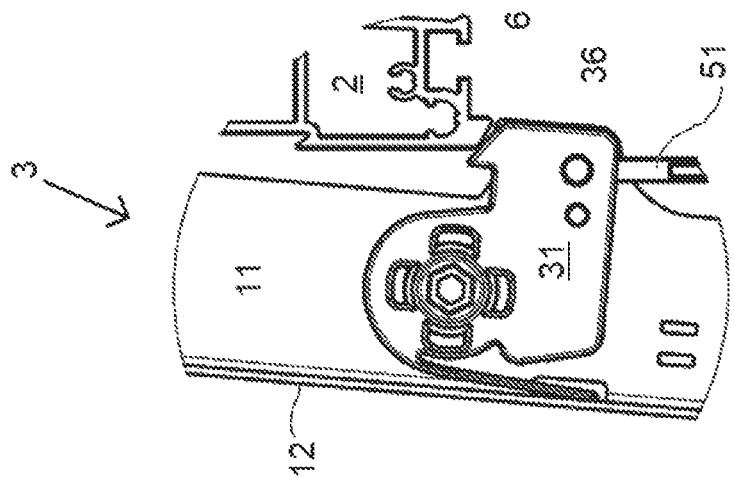

If there were a need to cancel this securing action of securing body 31, it is possible to pull downwards on pull cord 51, after which the securing body 31 will again assume the orientation as illustrated in FIG. 3b with respect to the associated screen body 3. Thus, space is provided for the second hook edge 36 to pass the first hook edge 6, after which the situation according to FIG. 3a can be reached again and the screen can be removed from the base body 2. The hexagonal recess 54 offers the possibility of, behind a viewing screen suspended using system 1, rotating the securing body 31 about the axis 53 by using a tool with a hexagonal head to engage with the cut-out 54, which may be useful, for example, in the absence of the pull cord 51.

Figures 4A, 4B:
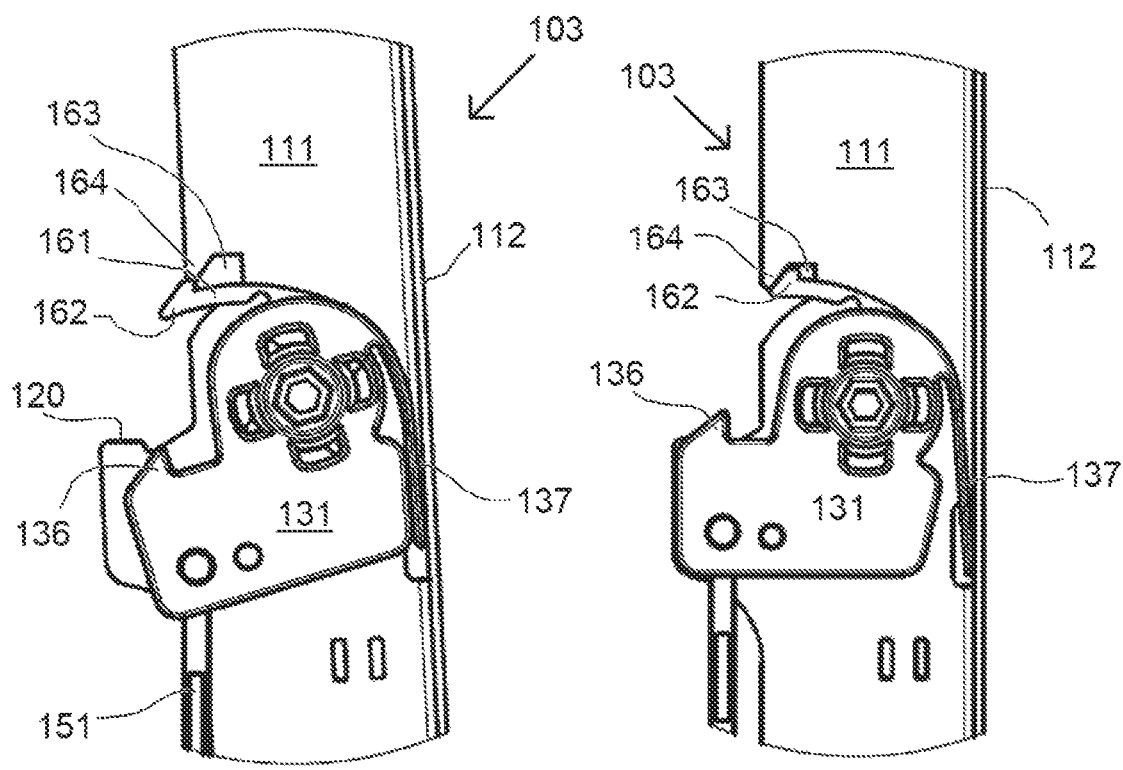
FIGS. 4a and 4b show a perpendicular horizontal view of two consecutive phases during use of the system according to a second embodiment.

FIGS. 4a and 4b relate to an alternative embodiment. Where applicable, for similar components of the system, the same reference numerals are used in FIGS. 4a and 4b as in the description of FIGS. 1a to 3c, but increased by 100. Securing body 131 is provided with a second resilient lip 161 which is provided, at the front end thereof, with a hook edge 162. A recess 163 is provided in the first screen body part 111 of screen body 103, as a result of which the screen body 103 is also provided, in the first screen body part 111 thereof, with a hook edge 164.

In securing operation of securing body 131, hook edge 162 extends within the recess 163. Pulling downwards on pull cord 151 starting from this situation causes securing body 131 in FIGS. 4a and 4b to pivot anti-clockwise, and due to bevelling along the oblique flanks of the hook edges 162 and 164, hook edge 162 will move out of recess 163 and come to hook behind hook edge 164, partly under the influence of the resilient action of lip 137. Thus, it is therefore not necessary to pull continuously on pull cord 151 in order to keep securing body 131 in its free position, such that a viewing screen can be removed in a simple manner. When repositioning the viewing screen, base body 2 will strike against the oblique flank of hook edge 162, as a result of which the latter is pushed downwards slightly and comes free from hook edge 164 so as to subsequently move back towards recess 163 due to the action of resilient lip 137.

Figure 5:
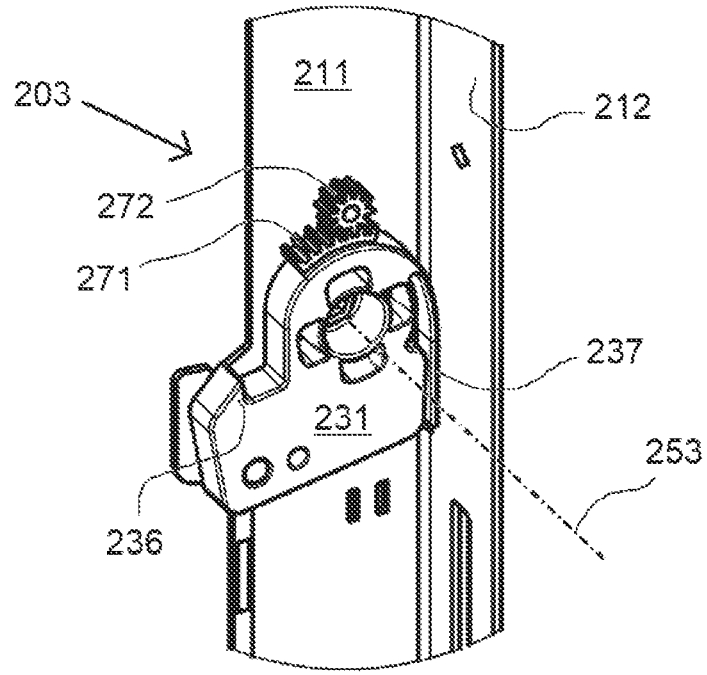
FIG. 5 shows an isometric view of a system according to a third embodiment.

In the embodiment according to FIG. 5, components which are similar to those of the first embodiments according to FIGS. 1a to 3c are denoted by reference numerals which are increased by 200 in relation to the reference numerals used in FIGS. 1a to 3c. Securing body 231 is provided, on the top side thereof, with a rack 271 which runs in a curved manner, the centre of the curved shape in question coinciding with axis 253 for securing body 231. Rack 271 is in engagement with pinion 272 which is rotatably fastened to the first screen body part 211 of screen body 203. Pinion 272 is provided with a time-delaying brake, as a result of which pinion 272 has a certain degree of resistance to rotation. Such pinions, also referred to as rotary dampers, are marketed, for example, by the company Fastpoint and are already used, for example, in glove boxes in cars. Due to the braking action of pinion 272, securing body 231 will, in spite of the action of the resilient lip 237, not return from the open position according to FIG. 5 to the securing position directly, but merely with a slight delay, as a result of which a user is afforded some time to remove the viewing screen from the system in question. After a certain amount of time, the securing body 231 will, however, always assume the securing position, or at least the orientation belonging to the securing position, such that the securing body can never unintentionally remain in the free position.

The invention claimed is:

1. A system for positioning a viewing screen, the system comprising:
    a base body;
    at least one screen body comprising a suspension hook, at least one screen body configured to:
        rigidly connect, at least in one position of the at least one screen body, to the base body; and
        fasten a viewing screen thereto; and
    a securing body for releasably securing the rigid connection between the base body and the screen body,
    wherein the base body comprises a suspension edge, and the suspension hook and the suspension edge are configured to suspend the at least one screen body from the suspension edge of the base body via the suspension hook,
    wherein the base body has a first hook edge and the securing body has a second hook edge,
    wherein the second hook edge is displaceable with respect to the at least one screen body between a securing position in which the first hook edge and the second hook edge engage with each other, as a result of which or at least partly as a result of which the at least one screen body is rigidly connected to the base body, and a free position in which the first hook edge and the second hook edge are free from each other to such an extent that the at least one screen body is displaceable with respect to the base body,
    wherein the system further comprises a spring member which is configured to withstand displacement of the second hook edge from the securing position to the free position, wherein the securing body is connected to the screen body so as to be pivotable about a pivot axis between the securing position and the free position, and
    wherein the at least one screen body comprises a first recess and the securing body has a protruding part which is inserted in the recess, wherein at least one part of a periphery of the protruding part of the securing body has a circular profile and adjoins at least one part of a periphery of the first recess in a guiding manner for guiding cooperation between the periphery of the protruding part and the recess during pivoting of the securing body between the securing position and the free position.

2. The system according to claim 1, wherein the first recess has at least one outwardly directed recess part, and wherein the protruding part of the securing body comprises, on the periphery of the protruding part, at least one outwardly directed retaining part, which at least one retaining part is configured to, during assembly of the securing body on the screen body, be inserted from a first side through the at least one recess part and to subsequently be rotated about the pivot axis such that the retaining part comes to lie against a second side of the at least one screen body that is situated opposite to the first side.

3. The system according to claim 1, wherein the spring member comprises at least one resilient lip.

4. The system according to claim 3, wherein the at least one resilient lip forms part of the securing body, an integral part thereof.

5. The system according to claim 1, wherein the at least screen body comprises a second recess and the spring member has a fixing part which is inserted in the second recess in order to fix the spring member with respect to the screen body at a location of the fixing part.

6. The system according to claim 1, wherein, during pivoting of the securing body from the securing position to the free position, the spring member bears against a stop surface of the at least one screen body or at least of a part rigidly connected thereto and the spring member compresses.

7. The system according to claim 1, wherein the system has a blocking device for blocking the securing body in the free position thereof.

8. The system according to claim 7, wherein the blocking device is configured to automatically start working due to the pivoting of the securing body from the securing position to the free position.

9. The system according to claim 7, wherein the blocking device comprises a first blocking hook edge which pivots together with the securing body, and also a second blocking hook edge which forms part of the screen body or forms part at least of a part rigidly connected thereto, which first blocking hook edge and second blocking hook edge engage with each other under an influence of a resilient action of the spring member with blocking action of the blocking device.

10. The system according to claim 1, wherein the system has a slowing device for resisting an action of the spring member during pivoting of the securing body from the free position to the securing position.

11. The system according to claim 10, wherein the slowing device comprises a transmission having two transmission members which, during at least a part of the pivoting of the securing body from the free position to the securing position, preferably during only one part of the pivoting of the securing body from the free position to the securing position, which part preferably comprises the free position, are configured to slow down speed with which the securing body pivots from the free position to the securing position under an influence of the spring member.

12. The system according to claim 1, wherein the securing body is a plastics product produced by means of injection moulding.

13. The system of claim 1, wherein the securing body comprises an elongate pull element for causing the securing body to pivot about the pivot axis from the securing position to the free position counter to an action of the spring member by pulling on the pull element in a length direction thereof.

14. A system for positioning a viewing screen, the system comprising:
a base body;
at least one screen body comprising a suspension hook, at least one screen body configured to:
rigidly connect, at least in one position of the at least one screen body, to the base body; and
fasten a viewing screen thereto; and
a securing body for releasably securing the rigid connection between the base body and the screen body,
wherein the base body comprises a suspension edge, and the suspension hook and the suspension edge are configured to suspend the at least one screen body from the suspension edge of the base body via the suspension hook,
wherein the base body has a first hook edge and the securing body has a second hook edge,
wherein the second hook edge is displaceable with respect to the at least one screen body between a securing position in which the first hook edge and the second hook edge engage with each other, as a result of which or at least partly as a result of which the at least one screen body is rigidly connected to the base body, and a free position in which the first hook edge and the second hook edge are free from each other to such an extent that the at least one screen body is displaceable with respect to the base body,
wherein the system further comprises a spring member which is configured to withstand displacement of the second hook edge from the securing position to the free position, wherein the securing body is connected to the screen body so as to be pivotable about a pivot axis between the securing position and the free position,
wherein the spring member comprises at least one resilient lip, and
wherein the at least one resilient lip forms part of the securing body, an integral part thereof.

15. The system according to claim 14, wherein the at least one screen body comprises a recess and the securing body includes a protruding part which is inserted in the recess.

16. The system according to claim 15, wherein at least one part of a periphery of the protruding part of the securing body has a circular profile and adjoins at least one part of a periphery of the recess.

17. A system for positioning a viewing screen, the system comprising:
a base body;
at least one screen body comprising a suspension hook, at least one screen body configured to:
rigidly connect, at least in one position of the at least one screen body, to the base body; and
fasten a viewing screen thereto; and
a securing body for releasably securing the rigid connection between the base body and the screen body,
wherein the base body comprises a suspension edge, and the suspension hook and the suspension edge are configured to suspend the at least one screen body from the suspension edge of the base body via the suspension hook,
wherein the base body has a first hook edge and the securing body has a second hook edge,
wherein the second hook edge is displaceable with respect to the at least one screen body between a securing position in which the first hook edge and the second hook edge engage with each other, as a result of which or at least partly as a result of which the at least one screen body is rigidly connected to the base body, and a free position in which the first hook edge and the second hook edge are free from each other to such an extent that the at least one screen body is displaceable with respect to the base body,
wherein the system further comprises a spring member which is configured to withstand displacement of the second hook edge from the securing position to the free position, wherein the securing body is connected to the screen body so as to be pivotable about a pivot axis between the securing position and the free position, and
wherein the system includes a blocking device for blocking the securing body in the free position thereof.

* * * * *